UNITED STATES PATENT OFFICE.

CARL JAGERSPACHER, OF BASEL, SWITZERLAND, ASSIGNOR TO SOCIETY OF CHEMICAL INDUSTRY IN BASLE, OF BASEL, SWITZERLAND.

AZO DYESTUFFS DYEING ON MORDANTS AND PROCESS OF MAKING SAME.

1,323,285.      Specification of Letters Patent.      Patented Dec. 2, 1919.

No Drawing.      Application filed May 14, 1919. Serial No. 296,939.

*To all whom it may concern:*

Be it known that I, CARL JAGERSPACHER, a citizen of the Swiss Republic, and resident of Basel, Switzerland, have invented new and useful Azo Dyestuffs Dyeing on Mordants and Processes of Making Same, of which the following is a full, clear, and exact specification.

I have found that by combining aromatic diazocompounds, which do not contain a hydroxyl group in an ortho-position relatively to the diazo group, with 1.8-dioxynaphthalenesulfocarboxylic acids, there are obtained new azodyestuffs dyeing on mordants, which are particularly suitable for printing cotton with chromium mordants. These dyestuffs constitute, in a dry state, brown-red to black powders, dissolve in water with red to violet colorations and in concentrated sulfuric acid to violet solutions, dye wool in an acid bath red to blue tints becoming, on subsequent chroming, fast blue to black, and produce fast blue to black prints, when printed on cotton with chromium mordants.

The invention is illustrated by the following examples:

*Example 1.*

13.7 parts of anthranilic acid are diazotized in known manner and the resulting diazocompound is poured into an acetic solution of 28.4 parts of 1.8-dioxynaphthalene-3-sulfo-6-carboxylic acid while stirring. The combination being achieved, the dyestuff is salted out, filtered off and dried.

It constitutes in a dry state, a brown-red powder, which dissolves in water to red solutions and in concentrated sulfuric acid to violet solutions and dye wool, in an acid bath, pure blue-red tints turning, on subsequent chroming, to a fast blue. When printed on cotton with chromium mordants, it gives fast gray-blue prints.

*Example 2.*

The diazo-compound derived, in known manner, from 15 parts paraaminoacetanilid is united in a form as concentrated as possible with a concentrated solution of 28.4 parts of 1:8-dioxynaphthalene-6-sulfo-3-carboxylic acid and of 30 parts crystallized sodium acetate. The combination being achieved, 140 parts of soda lye of 30 per cent. are added to the mass of reaction of for instance 500 parts by volume and hereafter the mass is boiled for 10 minutes in order to split off the acetyl group. The mass is then acidified with hydrochloric acid, whereby the dyestuff precipitates entirely. The dyestuff constitutes, in a dry state, a green-black powder, which dissolves in water to violet solutions and in concentrated sulfuric acid to red-violet solutions. It dyes wool, in an acid bath, violet-blue tints turning, on subsequent chroming, to a fast gray, and produces, when printed on cotton with chromium mordants, black prints fast to soaping, chlorin and light.

What I claim is:

1. The herein described process for the manufacture of azodyestuffs dying on mordants, which consists in combining aromatic diazo compounds, which do not contain a hydroxyl group in an ortho position relatively to the azo group, with 1:8-dioxynaphthalene-sulfo-carboxylic acids.

2. As new products, the herein described azodyestuffs derived from 1.8-dioxynaphthalene-sulfocarboxylic acids and aromatic diazo compounds, which do not contain a hydroxyl group in an orthoposition relatively to the azogroup, which constitute, in a dry state, brown red to black powders, dissolve in water with red to violet coloration, dye wool, in an acid bath, red to blue tints becoming, on subsequent chroming, fast blue to black and produce, when printed on cotton with chromin mordants, fast blue to black prints.

3. As a new article of manufacture, the herein described azodyestuff resulting from the combination of para-acetylaminodiazobenzine with 1.8-dioxynaphthalene-3-sulfo-6-carboxylic acid and subsequent splitting off of the acetyl group by saponification, which constitutes, in a dry state, a green-black powder, is soluble in water to violet solutions and in concentrated sulfuric acid to red-violet solutions, dyes wool, in an acid bath violet blue tints turning, on subsequent chroming, to a fast gray and gives, when printed on cotton with chromium mordants, black prints fast to soaping, chlorin and light.

In witness whereof I have hereunto signed my name this 16th day of April, 1919, in the presence of two subscribing witnesses.

CARL JAGERSPACHER.

Witnesses:
     SCOTT TAGGART,
     AMAND RITTER.